United States Patent [19]
Asakai et al.

[11] 3,948,154
[45] Apr. 6, 1976

[54] AIR CIRCULATION SYSTEM

[75] Inventors: Masaru Asakai, Tokyo; Kaoru Masuko, Higashimurayama; Kazuo Takeuchi, Mitaka, all of Japan

[73] Assignee: Nissan Motor Co., Ltd., Yokohama, Japan

[22] Filed: May 2, 1974

[21] Appl. No.: 466,497

[52] U.S. Cl. .......................... 98/2; 98/40 R; 236/49
[51] Int. Cl.² ..................................... F24F 13/06
[58] Field of Search .......... 236/49, 46; 98/39, 40 R, 98/40 C, 2, 94

[56] References Cited
UNITED STATES PATENTS

| | | |
|---|---|---|
| 2,038,578 | 4/1936 | Lamb .................................. 237/2 |
| 2,976,795 | 3/1961 | Brugler .............................. 98/40 C |
| 3,264,450 | 8/1966 | Wallace ........................... 237/12.3 B |
| 3,329,341 | 7/1967 | Jones ................................... 236/46 |
| 3,685,427 | 8/1972 | Loyd ..................................... 98/94 |
| 3,824,910 | 7/1974 | Temming ................................. 98/2 |

*Primary Examiner*—William E. Wayner

[57] ABSTRACT

An air circulation system for periodically varying the volume and/or direction of the air flow applied to the occupant in a room.

10 Claims, 5 Drawing Figures

AIR CIRCULATION SYSTEM

This invention relates to an air circulating system, and more particularly novel air circulating system for cyclically varying the volume of the air applied to the occupant in a room of a motor vehicle.

In an air circulating system for supplying fresh or conditioned air into a room, for example a cabin of a motor car or an aircraft, the air is admitted into the room from an air duct through an air outlet port provided for an instrument board or an upper rail of the vehicle. Usually, one end of the duct is connected to an air conditioning unit or an air circulating unit and the outlet port, or a grille is provided with a plurality of manually adjustable vanes for regulating the volume of the air. Accordingly, once the vanes are adjusted, the volume, velocity and direction of the air flowing into the room are maintained constant.

The comfortableness of the air circulating through a room is determined depending upon the quality of the air and the pattern of air flow. The quality of the air is determined by such factors as temperature, relative humidity and flow velocity, whereas the pattern of air flow by the direction, flow velocity and waveform of the air flow.

In order to provide an adequate comfortableness in summer with natural ventilation under environmental conditions of a temperature of 30°C and of a relative humidity of 83%, for example, a flow velocity of air of from about 2.6m/sec. to 1.8m/sec. is generally required. Accordingly, in an air circulation system, a valve in the air duct or the vanes provided for the air outlet port are required to be adjusted to satisfy this condition.

Actually, however, the flow velocity required for providing an adequate comfortableness in a room varies depending upon such factors as the temperature, relative humidity, etc. desired in the room. In this manner, as the air velocity is influenced by a number of variable factors, it is impossible to always provide an ideal flow velocity with the conventional manually regulated air circulating system. For example, with the adjustable vanes, it is possible to direct cool air in a desired direction and at a definite volume. When a person is subjected to such flow of cool air, the temperature of the skin thereof decreases gradually. More particularly, at first the skin feels cool, but as the temperature of the skin becomes equal to that of the air stream, the skin no more feels cool but merely feels air flow. As the temperature of the skin decreases further, it feels chilly.

It is an object of this invention to provide a novel air circulation system capable of supplying air into a room under comfortable conditions.

Another object of this invention is to provide a novel air circulation system wherein the volume of fresh or conditioned air supplied into a room is varied periodically, thus obviating various problems described above.

Another object of this invention is to provide a novel air circulation system wherein the direction of fresh or conditioned air supplied into a room is varied periodically so as to obviate problems described above.

Further objects and advantages of the invention can be more fully understood from the following detailed description taken in conjunction with the accompanying drawings in which.

Figure 1:
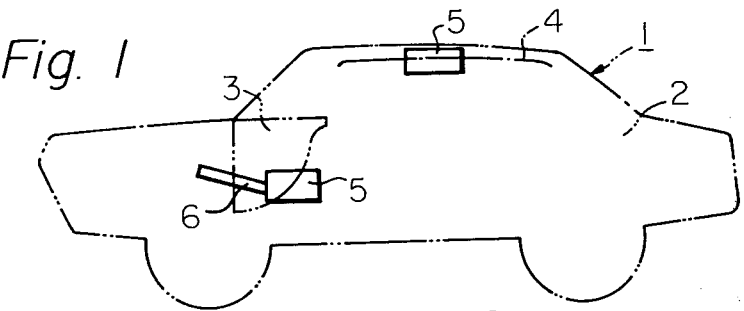
FIG. 1 is a diagrammatic representation of a motor car embodying the invention.
Figure 2:
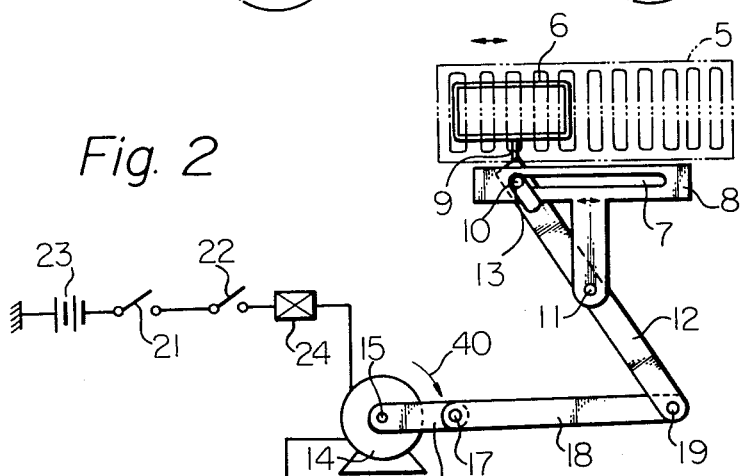
FIG. 2 shows an air regulating system embodying the invention and utilized in the motor car shown in FIG. 1.

Referring first to FIG. 1 of the accompanying drawing, an air outlet port or a grille 5 is provided at an instrument board 3 or an upper rail 4 mounted in a cabin 2 of a motor vehicle 1. At the back of the grille 5 is disposed a flexible duct 6 which may be replaced by a duct including a universal joint, the duct 6 being in turn communicated with an air conditioning device or an air circulation device (not shown). As shown in FIG. 2, associated with the duct 6 is a T-shaped guide member 8 provided with an elongated slot 7 for receiving a pin 10 provided at the lower end of a connecting rod 9 with its upper end secured to the duct. The lower end of the guide member 8 is pivotally connected as at pin 11 with a lever 12 having an elongated slot 13 at its upper end for receiving the pin 10 of the connecting rod 9. The lower end of the lever 12 is connected with one end of a lever 18 by means of a pivot pin 19. The lever 18 is pivotally connected through a pivot pin 17 to an arm 16 or a crank which is fixed to the shaft 15 of an electric motor 14. Accordingly, as the motor 14 rotates in the direction of arrow 40, the lever 18 will be swinged about pin 11 with the result that the lever 12 will be swung along the grille 5, whereby the direction of air flow passing through the grille can be varied.

As shown in FIG. 2, the motor 14 is connected to a source of power 23 via serially connected ignition switch 21 and a motor start switch 22. Alternatively, switch 22 may be connected in parallel with the ignition switch 21. A control circuit 24 for controlling the speed of motor 14 in such a manner as described hereinafter is connected in series with motor 14.

Figure 3:
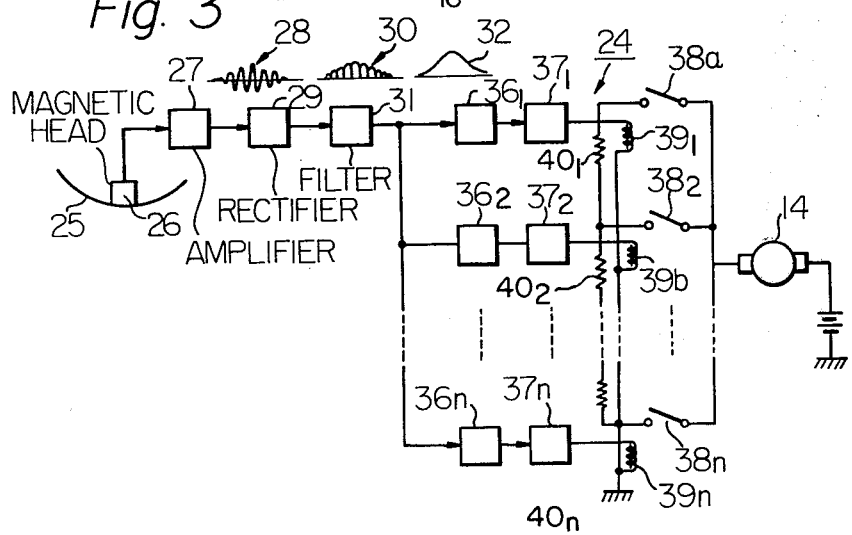
FIG. 3 is a connection diagram of a control system for controlling the speed of an electric motor utilized in the regulating system shown in FIG. 2.

The construction and operation of the control circuit 24 will now be described with reference to FIGS. 3 and 4. A pulse or sinusoidal signal whose amplitude has been modulated by a low-frequency signal of, for example, about 1 KH$_z$, is recorded in a magnetic recording medium 25, and the recorded signal is picked up by a magnetic head 26 and amplified by an amplifier 27 to produce an amplitude modulated signal 28. The magnetic recording medium 25 and magnetic head 26 may be replaced by another circuit arrangement which produces a desired signal. The output of the amplifier 27 is rectified by a full wave rectifier 29 to provide a signal 30 which is applied to a filter 31 so as to obtain a signal 32 having a waveform similar to a half wave of an alternating voltage. The amplitude variation of the signal 32 causes periodical variation of volume and/or direction of the air admitted into the room. The output from the filter is applied to a trigger circuit 24 including a plurality of parallel branch circuits respectively including serially connected Schmidt trigger elements $36_1$ through $36n$, amplifiers $37_1$ through $37n$ and relay coils $39_1$ through $39n$. The movable relay contacts of relay switches $38_1$ through $38n$ are connected in parallel to one terminal of the motor 14, whereas the stationary contacts of the relay switches are respectively connected to ends of serially connected resistors $40_1$ through $40n$, each having a resistance of several ohms, for example. However, the stationary contact of the relay switch $38n$ is connected to the ground. The other terminal of motor 14 is connected to one terminal of a power source the other terminal of which is grounded. The Schmidt trigger elements $36_1$ through $36n$ have different trigger voltages, the highest trigger voltages of the elements $36_1$ through $36n$ are, in this case, arranged to decrease in the order named. Suppose now that the voltage of the output pulse 32 increases gradually. At a predetermined low voltage, relay switch $38_1$ is firstly closed whereby motor 14 is energized through all serially connected resistors $40_1$ through $40n$. As the voltage of the output signal increases succeeding branch circuits trigger sequentially thereby gradually decreasing the number of resistors $40_1$ through $40n$ connected in series with motor 14 thereby to accelerate motor 14. Finally, the branch circuit including the element $36n$ triggers at which time the motor 14 is directly energized by the source thus attaining the highest speed. Conversely, as the voltage of the output pulse 32 decreases gradually, the number of triggered branch circuits decreases thus decelerating the motor 14.

Figure 4:
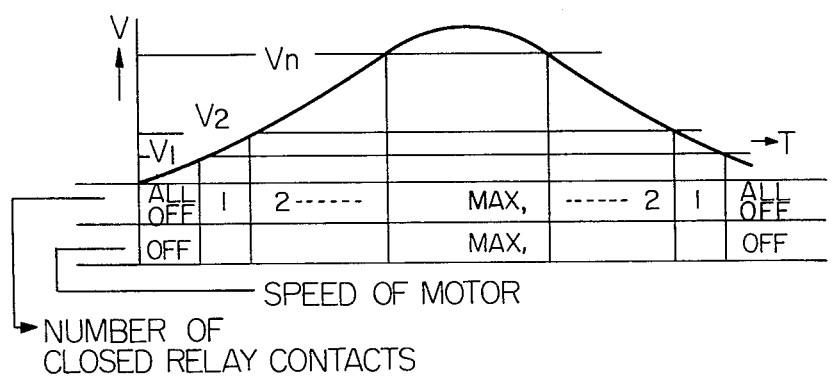
FIG. 4 is a graph showing the relationship between the number of closed relay contacts and the speed of the motor controlled by the control system shown in FIG. 3.

FIG. 4 is a graph showing the relationship between the voltage V of the output signal 32 and the numbers of closed relay switch, or the speed of the motor, in which the ordinate represents the voltage V and the abscissa time T. At a voltage level $V_1$, only the branch circuit including the element $36_1$ triggers thus closing relay switch $38_1$. At a higher voltage level $V_2$, the branch circuits respectively including elements $36_1$ and $36_2$ trigger thus closing two relay switches $38_1$ and $38_2$, and at the highest voltage level Vn all branch circuits trigger for closing all relay contacts thus operating the motor at a maximum speed.

Instead of using a pin and slot connection, the connecting rod 9 may be connected with lever 12 by means of a clamp slidable along the rod 9. It will be clear that any other connecting mechanism can be used. Since the speed of motor 14 and hence the duct 6 is varied cyclically at a definite frequency, not only the direction of air flow can be varied over a relatively wide range, but also the volume of the air admitted through the grille 5 can be varied cyclically. In other words, the air flow pulsates at a definite frequency with the result that the skin of a person is subjected to recurrent stimulations thus cyclically varying the temperature thereof. Accordingly, there is no fear of paralysing the skin or giving uncomfortable feeling caused by an air flow of a definite direction and of constant volume as in the prior art system, thus increasing the effect of the air conditioning or ventilating system.

Figure 5:
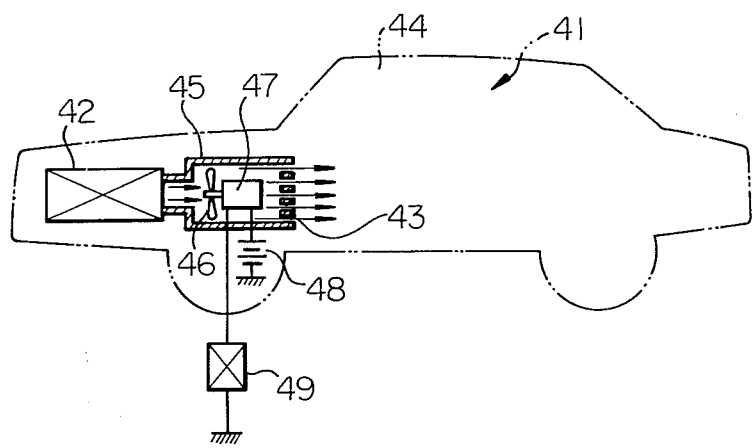
FIG. 5 shows a modified embodiment of this invention.

In a modified embodiment of this invention illustrated in FIG. 5, one end of a duct 45 is connected to an air conditioning unit 42 or a ventilation unit, which the other end of the duct is opened to the cabin 44 of a motor car 41 through a grille 43. The duct 45 contains a fan 46 driven by an electric motor energized by a battery 48 via a control circuit 49 identical to that shown in FIG. 3. Accordingly, the volume of the air supplied into the cabin 44 is varied periodically in the same manner as been described in connection with FIG. 3.

It should be now appreciated that a flexible air duct such as the air duct 6 of the embodiment of FIG. 1 may be employed in the embodiment of FIG. 5, so as to change not only the volume but also the direction of the air to be admitted into the room.

Although the invention has been shown and described in terms of some preferred embodiments thereof it should be understood that many changes and modification will be obvious to one skilled in the art without departing from the true spirit and scope of the invention as defined in the appended claims.

What is claimed is:

1. In an air circulating system for admitting air to a passenger room of a motor vehicle, the improvement comprising:

a flat grille mounted on a wall of said passenger room for allowing to admit air conveyed through in air duct to said passenger room;

an outlet means communicating with said air duct and being rectilinearly reciprocative along said grille; and actuating means connected to said outlet means for imparting smooth reciprocatory movement to said outlet means along said grille, said actuating means including an electric d-c motor, a control circuit connected to said d-c motor for supplying d-c voltage periodically varying in intensity, a crank mechanism connected to the rotary shaft of said d-c motor for converting the rotation of said rotary shaft into a reciprocatory movement, and a linkage interconnecting said crank mechanism and said outlet means for conveying the reciprocatory movement of said crank mechanism to said outlet means.

2. The improvement as defined in claim 1, in which said linkage includes:

a pivotally swingable lever having one end thereof connected to said crank mechanism and the other end thereof provided with an elongated slot;

a fixed guide member having an elongated slot;

a connecting rod having one end thereof secured to said outlet means; and a pin member mounted on the other end of said connecting rod, said pin member coupling with said elongated slots of said elver and said guide member.

3. The improvement as defined in claim 1, in which said control circuit includes:

a signal source for producing a signal varying in amplitude;

a preselected number of trigger circuits each connected to said signal source to receive said signal, said trigger circuits having trigger voltages different from one another;

relay coils respectively connected to said trigger circuits so that the relay coils are energized when the associated trigger circuits are triggered by said signal;

resistors of said preselected number connected in series with one another;

relay switches respectively associated with said relay coils, each for connecting one terminal of each of said resistors to one terminal of said d-c motor; and a d-c power source connected between the other terminal of said d-c motor and the remaining one terminal of the series connection of said resistors.

4. The improvement as defined in claim 3, in which said signal source includes:

magnetic recording and reproducing means for magnetically recording a high frequency carrier signal modulated by a low frequency signal and for reproducing said carrier signal;
an amplifier for amplifying said reproduced carrier signal;
a full wave rectifier for rectifying in full wave said carrier; and
a low pass filter for passing therethrough said low frequency signal.

5. In an air circulating system for admitting air to a passenger room of a motor vehicle, the improvement comprising:
a flat grille mounted on a wall of said passenger room for allowing to admit air conveyed through an air duct to said passenger room;
a fan positioned within said air duct for advancing air toward the outlet;
a prime mover connected to said fan for driving said fan; and
control means connected to said prime mover for smoothly regulating the rotation speed of said prime mover at a predetermined frequency, said control means including a signal source for producing a signal varying in amplitude, a preselected number of trigger circuits each connected to said signal source to receive said signal,
said trigger circuits having trigger voltages different from one another, relay coils respectively connected to said trigger circuits so that the relay coils are energized when the associated trigger circuits are triggered by said signal, resistors of said preselected number connected in series with one another, relay switches respectively associated with said relay coils, each for connecting one terminal of each of said resistors to one terminal of said d-c motor, and a d-c power source connected between the other terminal of said d-c motor and the remaining one terminal of the series connection of said resistors.

6. The improvement as defined in claim 5, in which said signal source includes:
magnetic recording and reproducing means for magnetically recording a high frequency carrier signal modulated by a low frequency signal and for reproducing said carrier signal;
an amplifier for amplifying said reproduced carrier signal;
a full wave rectifier for rectifying in full wave said carrier; and
a low pass filter for passing therethrough said low frequency signal.

7. The improvement as defined in claim 5, further comprising: an outlet means communicating with said air duct and being rectilinearly reciprocatible along said grille; and
actuating means connected to said outlet means for imparting smooth reciprocatory movement to said outlet means along said grille, said actuating means including an electric d-c motor, a control circuit connected to said d-c motor for supplying d-c voltage periodically varying in intensity, a crank mechanism connected to the rotary shaft of said d-c motor for converting the rotation of said rotary shaft into a reciprocatory movement, and a linkage interconnecting said crank mechanism and said outlet means for conveying the reciprocatory movement of said crank mechanism to said outlet means.

8. The improvement as defined in claim 7, in which said linkage includes:
a pivotally swingable lever having one end thereof provided witn an elongated slot;
a fixed guide member having an elongated slot;
a connecting rod having one end thereof secured to said outlet means; and
a pin member mounted on the other end of said connecting rod, said pin member coupling with said elongate slots of said lever and said guide member.

9. The improvement as defined in claim 7, in which said control circuit includes:
a signal source for producing a signal varying in amplitude,
a preselected number of trigger circuits each connected to said signal source to receive said signal, said trigger circuits having trigger voltages different from one another;
relay coils respectively connected to said trigger circuits so that the relay coils are energized when the associated trigger circuits are triggered by said signal;
resistors of said preselected number connected in series with one another;
relay switches respectively associated with said relay coils, each for interconnecting one terminal of each of said resistors to one terminal of said d-c motor; and
a d-c power source connected between the other terminal of said d-c motor and the remaining one terminal of the series connection of said resistors.

10. The improvement as defined in claim 9, in which said signal source includes:
magnetic recording and reproducing means for magnetically recording a high frequency carrier signal modulated by a low frequency signal and for producing said carrier signal;
an amplifier for amplifying said reproduced carrier signal;
a full wave rectifier for rectifying in full wave said carrier; and
a low pass filter for passing therethrough said low frequency signal.

* * * * *